(12) United States Patent
Kiziltas et al.

(10) Patent No.: US 11,555,097 B2
(45) Date of Patent: Jan. 17, 2023

(54) USE OF MICRO AND NANOCELLULOSE AS PERFORMANCE MODIFIERS IN FLEXIBLE POLYURETHANE FOAMS

(71) Applicant: Ford Global Technologies, LLC, Dearborn, MI (US)

(72) Inventors: Alper Kiziltas, Sarikamis (TR); Deborah Frances Mielewski, Ann Arbor, MI (US); Rachel L Couvreur, Grosse Pointe Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 17/039,487

(22) Filed: Sep. 30, 2020

(65) Prior Publication Data

US 2022/0098381 A1   Mar. 31, 2022

(51) Int. Cl.
| | |
|---|---|
| *C08J 9/12* | (2006.01) |
| *C08G 18/32* | (2006.01) |
| *C08G 18/73* | (2006.01) |
| *C08K 3/04* | (2006.01) |

(52) U.S. Cl.
CPC .......... *C08J 9/125* (2013.01); *C08G 18/3206* (2013.01); *C08G 18/73* (2013.01); *C08K 3/04* (2013.01); *C08G 2110/0083* (2021.01); *C08J 2203/10* (2013.01); *C08J 2375/08* (2013.01); *C08J 2401/02* (2013.01); *C08K 2201/011* (2013.01)

(58) Field of Classification Search
CPC ............ C08G 18/1833; C08G 18/3206; C08G 18/4829; C08G 18/4891; C08G 18/73; C08G 18/7671; C08J 2203/10; C08J 2375/08; C08J 2401/02; C08K 3/04; C08K 2201/011
See application file for complete search history.

(56) References Cited

U.S. PATENT DOCUMENTS

| | | | |
|---|---|---|---|
| 8,901,189 B2* | 12/2014 | McClarren | C08G 18/36 521/134 |
| 10,626,232 B2 | 4/2020 | Diallo et al. | |
| 2006/0135636 A1* | 6/2006 | Zhu | C08G 18/4018 521/172 |
| 2016/0108236 A1* | 4/2016 | Berry | C08G 18/6484 524/733 |
| 2016/0168363 A1* | 6/2016 | Nelson | D21C 9/007 106/18.11 |
| 2018/0036713 A1* | 2/2018 | Li | B01J 20/3085 |
| 2019/0330437 A1* | 10/2019 | Nagarajan | C08J 9/0061 |
| 2020/0102416 A1 | 4/2020 | Liao et al. | |

FOREIGN PATENT DOCUMENTS

| | | |
|---|---|---|
| EP | 3621749 | 3/2020 |
| WO | 2020086419 | 4/2020 |

* cited by examiner

*Primary Examiner* — John M Cooney
(74) *Attorney, Agent, or Firm* — Burris Law, PLLC (57) ABSTRACT

A polyurethane foam is produced by reacting a polyol-containing composition and an isocyanate composition. The polyol-containing composition includes a petrol-based polyol at greater than or equal to about 50 parts by weight percent and cellulose reinforcements. Additionally, a soy-based polyol is also included in various polyol-containing compositions.

20 Claims, 3 Drawing Sheets

FIG. 2

## USE OF MICRO AND NANOCELLULOSE AS PERFORMANCE MODIFIERS IN FLEXIBLE POLYURETHANE FOAMS

FIELD

The present disclosure relates to reinforced polyurethane foams.

BACKGROUND

The statements in this section merely provide background information related to the present disclosure and may not constitute prior art.

Conventional methods for developing polyurethane foams typically include reacting a mixture with at least one polyol with hydroxyl groups (such as petroleum-based polyols) with a mixture having at least one isocyanate and/or diisocyanates in the presence of additives, such as blowing agents, surfactants, catalysts, and any other desired additives by forming a gas (e.g., carbon dioxide) while urethane polymerization occurs (the mixture of the polyol mixture, the isocyanate mixture, and any additives is also referred to as a reaction mixture). The polyol mixture can include the additives. The gas is formed as a result of the blowing agent, which typically is water, reacting with the isocyanates, thereby forming carbon dioxide and polyurea. Other additives enhance the properties of the resulting foam, control the aforementioned reactions, and the like.

Such polyurethane foams are used in a variety of automotive applications, as they can form lightweight, flexible, high-resilience, and rigid foams, and can be used to form a wide variety of applications. It has been observed that bio-based (such as soy-based) polyols can be substituted for a small amount of the petroleum-based polyol, e.g., in an amount of up to about 12 parts by weight percent depending on the application, but greater concentrations of bio-based polyols greatly decrease mechanical and physical properties.

Structural reinforcements have been introduced with these polyurethane foams in order to improve physical and mechanical properties, especially for improved Noise Vibration Harshness (NVH) properties in automotive applications. However, introducing structural reinforcements in polyurethane foams can be challenging from a manufacturing standpoint and increase the cost of components manufactured from such foams.

These issues related to the design of structurally reinforced foams, particularly in automotive applications, are addressed by the present disclosure.

SUMMARY

This section provides a general summary of the disclosure and is not a comprehensive disclosure of its full scope or all of its features.

In a form, a polyurethane foam is produced by reacting a polyol-containing composition and an isocyanate composition. The polyol-containing composition includes a petrol-based polyol at greater than or equal to about 50 parts by weight percent and cellulose reinforcements.

In a variation, the polyurethane foam further includes at least one of a cell opener, a surfactant, a cross-linking agent, a catalyst, and a water blowing agent. In a further variation, the cell opener is at about 1 parts by weight percent; the surfactant is at about 0.5 parts by weight percent; the cross-linking agent is at about 1.5 parts by weight percent; the catalyst includes a first catalyst at about 0.6 parts by weight percent and a second catalyst at about 0.3 parts by weight percent; and the water blowing agent is at about 3 parts by weight percent.

In another variation, the polyurethane foam further includes less than or equal to about 50 parts by weight percent of a soy-based polyol.

In a further variation, the polyurethane foam includes carbon nanocrystals at greater than or equal to about 0.1 parts by weight percent to less than or equal to about 0.5 parts by weight percent.

In a still further variation, a vehicle component includes the polyurethane foam.

In other variations, the isocyanate composition is at about 53 parts by weight.

In another form, a polyurethane foam is produced by reacting a polyol-containing composition and an isocyanate composition. The polyol-containing composition includes a soy-based polyol at less than or equal to about 50 parts by weight percent, cellulose reinforcements at less than or equal to about 0.8 parts by weight percent, and a balance of a petrol-based polyol.

In a variation, polyurethane foam further includes at least one of a cell opener, a surfactant, a cross-linking agent, a catalyst, and a water blowing agent. In a further variation, the cell opener is at about 1 parts by weight percent; the surfactant is at about 0.5 parts by weight percent; the cross-linking agent is at about 1.5 parts by weight percent; the catalyst includes a first catalyst at about 0.6 parts by weight percent and a second catalyst at about 0.3 parts by weight percent; and the water blowing agent is at about 3 parts by weight percent.

In a further variation, the isocyanate composition is at greater than or equal to about 53 parts by weight percent to less than or equal to about 57 parts by weight.

In a still further variation, a vehicle component includes the polyurethane foam.

In a further form, polyurethane foam is produced by reacting a polyol-containing composition and an isocyanate composition. The polyol-containing composition includes cellulose reinforcements at less than or equal to about 0.8 parts by weight percent, and a balance of a petrol-based polyol.

In a variation, the polyurethane foam further includes at least one of a cell opener, a surfactant, a cross-linking agent, a catalyst, and a water blowing agent. In a further variation, the cell opener is at about 1 parts by weight percent; the surfactant is at about 0.5 parts by weight percent; the cross-linking agent is at about 1.5 parts by weight percent; the catalyst includes a first catalyst at about 0.6 parts by weight percent and a second catalyst at about 0.3 parts by weight percent; and the water blowing agent is at about 3 parts by weight percent.

In a further variation, a vehicle component includes the polyurethane foam. In a further still variation, the vehicle component is at least one of an engine cover, a headliner, an instrument panel, a vehicle seat, and an armrest.

In a yet further variation, the polyol-containing composition includes less than or equal to about 50 parts by weight percent of a soy-based polyol.

In other variations, the isocyanate composition is at greater than or equal to about 53 parts by weight percent to less than or equal to about 57 parts by weight percent.

In another further variation, the cellulose reinforcements include at least one of a microcellulose filament, a nanocellulose filament, a cellulose filament, a cellulose nanofiber, and a cellulose nanocrystal.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, "isocyanates" include diisocyanates such as aromatic diisocyanates, toluene diisocyanates ("TDI"), and methylene diphenyl diisocyanates ("MDI"), as well as polyisocyanates, and mixtures thereof. Non-limiting examples of isocyanates include methylene diphenyl diisocyanate (MDI), toluene diisocyanate (TDI), hexamethylene diisocyanate (HDI), isophorone diisocyanate (IPDI), 4,4'-diisocyanatodicyclohexylmethane (H12MDI), 1,5-naphthalenediisocyanate (NDI), tetramethyllxylenediisocyanate (TMXDI), p-phenylenediisocyanate (PPDI), 1,4-cyclohexane diisocyanate (CDI), tolidine diisocyanate (TODI), and combinations thereof. It is contemplated isocyanates may include polymeric materials.

As used herein, "petrol-based polyols" are polyether polyols which can be used in the practice of the present disclosure and are well known and widely available commercially. Such polyols are generally at least about 80% by weight or more of a composition or blend of compositions directly or indirectly obtained from a non-renewable resource such as crude oil. In other embodiments, the polyols are generally at least about 85% by weight, at least 90% by weight, and/or at least 95% by weight or more of a composition or blend of compositions directly or indirectly obtained from a non-renewable resource such as crude oil. Non-limiting examples of the polyether polyols include polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and random and block copolymer glycols prepared from blends or sequential addition of two or more alkylene oxides. The mechanical properties of the resultant polyurethane foam may dictate the consistency of the polyol. More specifically, higher molecular weight polyols generally form more flexible polyurethanes, whereas lower molecular weight polyols generally form more rigid polyurethanes.

As used herein, "bio-based polyols" refer to polyols generally at least about 80% by weigh or more of a composition or blend of compositions directly or indirectly obtained from a natural oil. In other embodiments, the polyols are generally at least about 85% by weight, at least 90% by weight, and/or at least 95% by weight or more of a composition or blend of compositions directly or indirectly obtained from a natural oil. Natural oil, as used herein, includes but is not limited to vegetable oils, algae oils, animal fats, tall oils, derivatives of these oils, combinations of any of these oils, and the like. Representative non-limiting examples of vegetable oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, pennycress oil, carnellina oil, and castor oil. Representative non-limiting examples of animal fats include lard, tallow, poultry fat, yellow grease, and fish oil, as well as polyols made from the bio-based diols 1,3-propanediol (PDO) and 1,4-butanediol (BDO) and diacids, including succinic acid and larger acids such as Elevance's Inherent C18 octadecanedioic acid (ODDA).

As used herein, "cellulose reinforcements"" include, by way of example, untreated or treated microcellulose and nanocellulose (e.g., treated via various methods, including alkaline treatments, silane treatments, acetylation treatments, benzoylation treatments, peroxide treatments, maleated coupling agent treatments, sodium chloride treatments, acrylation and acrylonitrile grafting treatments, isocyanate treatments, stearic acid treatments, permanganate treatments, triazine treatments, fatty acid derivate (oleoyl chloride) treatments, and fungal treatments, among others), cellulose nanofibers (CNF), cellulose nanocrystals (CNC), cellulose filaments (CF), cellulose nanocrystals from tunicates (t-CNC), algae-based micro and nanocellulose (ABC), bacterial cellulose (BC), alpha cellulose (AC), microcrystalline cellulose (MCC)). The cellulose filaments may be produced by pulling individual thin strands from natural cellulose fibers. In some forms, such cellulose reinforcements are composed of fibrillar elements of high length (e.g., several micrometers, up to millimeters) and range in width of nano size (e.g., 30 to 100 nm) to micro size (e.g., 100 to 500 nm) and have high aspect ratios, typically on the order of from at least about 200 to several thousand. Other types of cellulose reinforcements may be shorter lengthwise and accordingly have higher aspect ratios.

As noted above, polyurethane foams are typically prepared by reacting isocyanates with polyols in the presence of additives. In such a manner, it is contemplated that a polyol solution according to the present disclosure includes at least a petrol-based polyol, cellulose reinforcements, and any desired additives. Such additives, some of which may be optional, include at least one of a cell opener, a surfactant, a cross-linking agent, a catalyst, and a water blowing agent. It is also contemplated that a polyol solution may include a petrol-based polyol, a bio-based polyol, cellulose reinforcements, and any desired additives.

Blowing agents assist in preparing foam, and water is highly desirable as a blowing agent. Other blowing agents suitable according to the present disclosure include fluorocarbons, hydrochlorocarbons, chorofluorocarbons, hydrofluorocarbons, hydrocarbons. It is also contemplated that gas may be added directly to the polyol isocyanate reaction mixture to form the foam.

Surfactants are useful for cell nucleation and cell opening in foam applications and offer foam stabilization. One desirable surfactant is TEGOSTAB® B 4690, available from Evonik Degussa, but it is contemplated other nonionic surfactants may be suitable for preparing the polyurethane foams disclosed herein.

Cross-linking agents may be used to control flexural and other properties of the foam. Suitable cross-linking agents include diethanolamine (DEA) and triethanolamine, which, when used in foam application, build firmness and increase catalytic activity.

Catalysts enhance the processing characteristics and physical properties of polyurethane foams by promoting the basic chemical reactions between polyol and isocyanate, reactions between water and isocyanate, and reactions to trimerizate isocyanates. Catalysts may be selected according to the needs of a particular application, for example, to improve the polyether foaming process of a wide variety of foams, including high-density unfilled foam, filled foam, high load-bearing flexible foam, low-density foam, and high resilience molded foam. Other catalysts may be selected to delay the foam-forming reaction process, which can result in more open foam structures. Suitable catalysts according to the present disclosure are diluted amine ethers, such as NIAX® A300 and liquid, water-soluble tertiary amines, such as NIAX® A-300, each of which are available from Momentive Performance Materials. Tertiary amines may be desirable as catalysts when water is present in the polyol isocyanate reaction mixture, as it catalyzes the isocyanate to react with water to form urea linkages with urethane. According to a form, the catalyst may comprise a first catalyst comprised of a diluted amine ether, and a second catalyst comprised of a water-soluble tertiary amine.

Cell openers may be used to prepare foam structures that have predominantly open cells, which gives it a larger value of air permeability and include water-soluble emulsifiers, such as LUMULSE® POE (26) GLYC, available from Vantage Specialty Chemicals, Inc.

Other optional additives include buffers, dendritic macromolecules, inorganic particulates, other types of polyols not listed herein, polyisocyanates, flame retardants, deodorants, colorants, fillers, combinations thereof, and other additives known to those familiar with the technology.

Petrol-Based Polyurethane Foams with Cellulose Reinforcements

Various petrol-based foam compositions shown below in Table 1 were prepared and tested according to the teachings of the present disclosure.

TABLE 1

Example/Test Petrol-Based Compositions

| Polyols and Additives | Component Type | Mass (g) | | | |
|---|---|---|---|---|---|
| Voranol 4701 | Petroleum Polyol | 182.41 | 182.41 | 182.41 | 182.41 |
| Lumulse POE (26) GLYC | Cell Opener | 1.82 | 1.82 | 1.82 | 1.82 |
| Tegostab B4690 | Surfactant | 0.91 | 0.91 | 0.91 | 0.91 |
| Diethanolamine (DEA) | Cross Linker | 2.74 | 2.74 | 2.74 | 2.74 |
| Niax A300 | Catalyst | 1.09 | 1.09 | 1.09 | 1.09 |
| Niax A1 | Catalyst | 0.55 | 0.55 | 0.55 | 0.55 |
| Deionized Water | Blowing Agent | 5.47 | 5.47 | 5.47 | 5.47 |
| CNC | Cellulose Reinforcement | 0 (0%) | 0.2935 (0.1%) | 0.7348 (0.25%) | 1.473 (0.5%) |
| Rubinate 7304 | Diisocyanate (MDI) | 98.2 | 98.2 | 98.2 | 98.2 |

These petrol-based foam compositions were produced according to the following procedure. First, a polyol mixture was formed by mixing together about 100 parts by weight percent petrol-polyol (e.g., VORANOL® 4701, available from Dow Chemical Co.), a cell opener (e.g., LUMULSE® POE (26) GLYC available from Lambent Corporation), about 1.8 parts by weight percent surfactant (e.g., TEGOSTAB® B4690, available from Evonik Nutrition & Care GmbH), about 2.7 parts by weight percent cross-linking agent (DEA), about 1.1 parts by weight percent a first catalyst (e.g., NIAX® A1, available from Momentive Performance Materials) and about 0.5 parts by weight percent a second catalyst (e.g., NIAX® A300, also available from Momentive Performance Materials), about 5.5 parts by weight percent blowing agent (deionized water), and, optionally, about 0.1 parts by weight percent, about 0.25 parts by weight, or about 0.5 parts by weight percent cellulose nanocrystals with a handheld mixer for a minimum of three minutes. Control samples without cellulose nanocrystals were also prepared. An isocyanate (e.g., RUBINATE® 7304, available from Huntsman International LLC) was added to the polyol mixture and mixed until the reaction mixture doubled in size. The reaction mixture was transferred to a mold and removed from the mold after seven minutes. The mold was then held in an oven at 65° C. for 30 minutes and subsequently removed from the oven. For each working example, three samples were produced for materials properties and characterization.

The resultant foams of the working examples shown in Table 1 had their apparent density tested according to ASTM 3574-08, Test A; their compression force deflection tested according to ASTM 3574-08, Test C; their wet compression tested according to ASTM 3574-08, Test L; their tensile strength at break tested according to ASTM 3574-08, Test E; their elongation at max load tested according to ASTM 3574-08, Test E; and their test strength tested according to ASTM 3574-08, Die C.

As can be seen in FIGS. 1A-1J and with reference to Table 2, the working examples having CNC have comparable or exceptional mechanical properties in comparison to the control working examples having no CNC. (Parentheticals represent standard deviation).

TABLE 2

Mechanical Properties of Compositions Formed According to Table 1

| | Density (kg/m³) | Wet Compression Set (% Compression) | Compression Modulus (MPa) | Compression Stress at 25% Strain (MPa) | Compression Stress at 50% Strain (MPa) | Compression Stress at 65% Strain (MPa) |
|---|---|---|---|---|---|---|
| 0% CNC 100% Petroleum | 41.33 (0.85) | 21.35 (0.84) | 0.031 | 2.76 (0.082) | 4.08 (0.13) | 6.2 (0.2) |
| 0.1% CNC 100% Petroleum | 46.45 (1.25) | 13.1 (1.39) | 0.063 (0.01) | 2.73 (0.13) | 4.48 (0.056) | 8.81 (0.16) |
| 0.25% CNC 100% Petroleum | 47.36 (0.39) | 11.15 (0.79) | 0.5 (0.065) | 3.05 (0.058) | 4.79 (0.16) | 7.79 (0.17) |
| .5% CNC 100% Petroleum | 53.07 (6.3) | 14.19 (1.14) | 0.071 (0.09) | 3.00 (0.058) | 5.23 (0.17) | 9.46 (0.56) |

| | SAG Factor 65%/25% | SAG Factor 50%/25% | Maximum Tensile Strength (kPa) | Elongation at maximum load (mm) | Modulus (Mpa) | Tear Resistance (N/m) |
|---|---|---|---|---|---|---|
| 0% CNC 100% Petroleum | 2.25 | 1.48 | 118 (6.4) | 98 (4.16) | 0.2 (0.29) | 0.5 (0.045) |
| 0.1% CNC 100% Petroleum | 3.22 | 1.64 | 70 (13.33) | 76 (9.05) | 0.16 (0.002) | 0.39 (0.026) |
| 0.25% CNC 100% Petroleum | 2.55 | 1.57 | 73 (7.08) | 79 (14.3) | 0.14 (0.0054) | 0.41 (0.033) |
| .5% CNC 100% Petroleum | 3.15 | 1.74 | 80 (7.14) | 82 (5.75) | 0.15 (0.031) | 0.41 (0.012) |

For example, as shown in FIGS. 1A-1F, the foams having CNC exhibited suitable wet compression, adequate tear resistance, were somewhat denser than the control foams, and exhibited somewhat lower tear resistance tensile strength than the control foams. Referring to FIGS. 1G-1J, the CNC foams, however, exhibited superior compression properties.

Figure 1A:
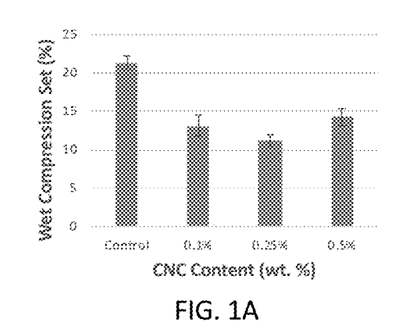
FIG. 1A is a chart showing the wet compression set of polyurethane samples prepared according to Table 1.
Figure 1B:
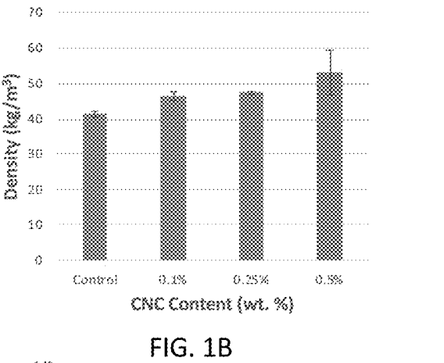
FIG. 1B is a chart showing the density of polyurethane samples prepared according to Table 1.
Figure 1C:
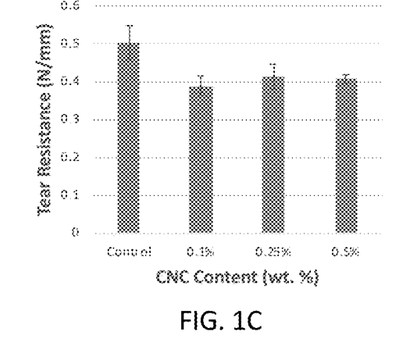
FIG. 1C is a chart showing the tear resistance of polyurethane samples prepared according to Table 1.
Figure 1D:
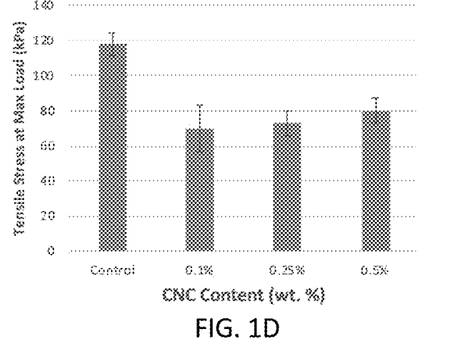
FIG. 1D is a chart showing the tensile stress at max load of polyurethane samples prepared according to Table 1.
Figure 1E:
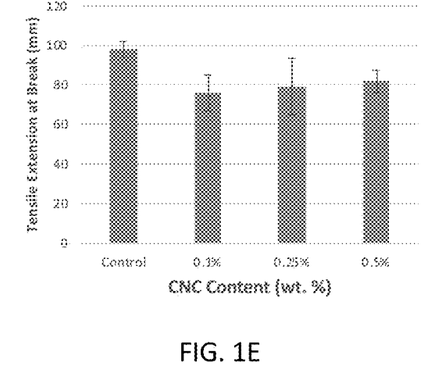
FIG. 1E is a chart showing the tensile extension at break of polyurethane samples prepared according to Table 1.
Figure 1F:
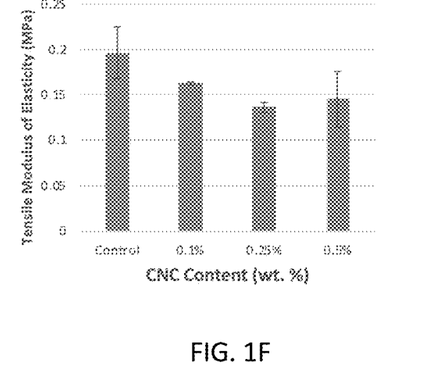
FIG. 1F is a chart showing the tensile modulus of elasticity of polyurethane samples prepared according to Table 1.
Figure 1G:
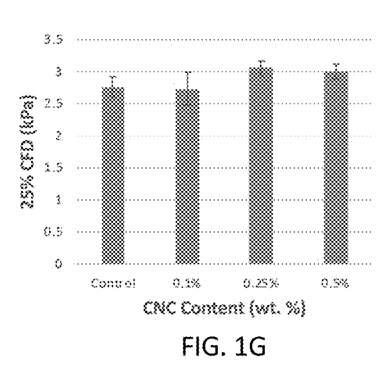
FIG. 1G is a chart showing the compression force deflection at 25% of polyurethane samples prepared according to Table 1.
Figure 1H:
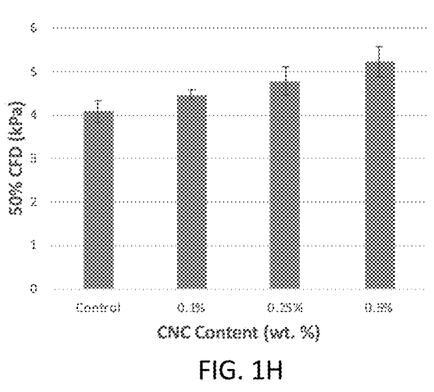
FIG. 1H is a chart showing the compression force deflection at 50% of polyurethane samples prepared according to Table 1.
Figure 1I:
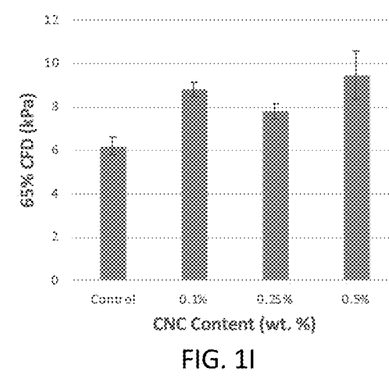
FIG. 1I is a chart showing the compression force deflection at 65% of polyurethane samples prepared according to Table 1.
Figure 1J:
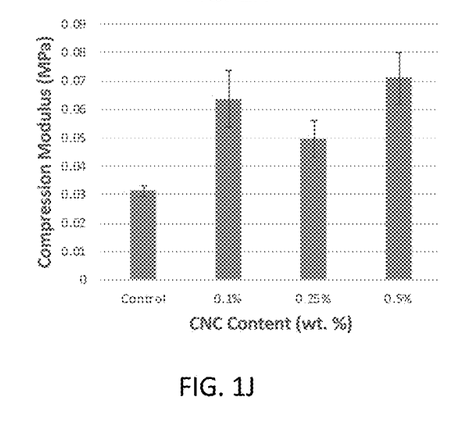
FIG. 1J is a chart showing the compression modulus of polyurethane samples prepared according to Table 1.
Figure 2:
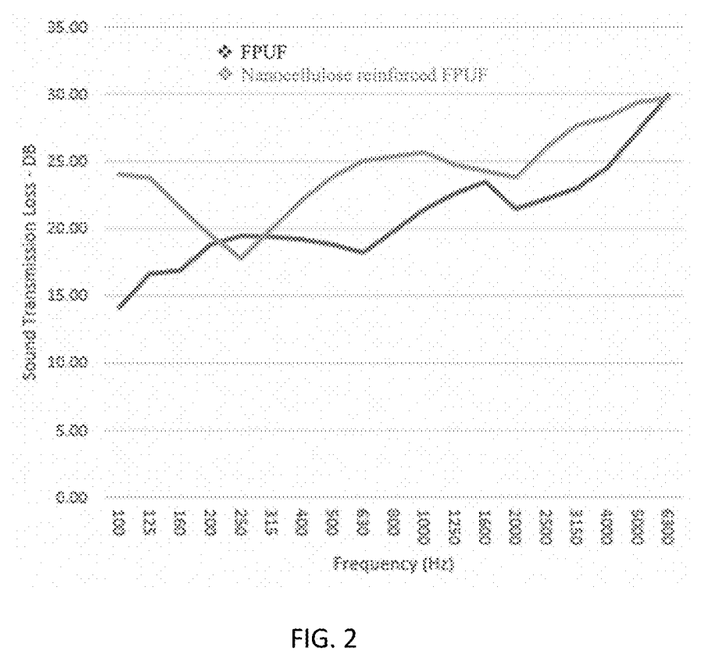
FIG. 2 is a graph showing the NVH properties of conventional polyurethane foams against the NVH properties of polyurethane foams having cellulose reinforcements according to the present disclosure.

Moreover, referring to FIG. 2, the CNC foams exhibited superior noise, vibration, and hardness (NVH) properties. And as because compression and NVH properties are more important than tensile properties for "under the hood" applications (applications that are generally in the engine compartment, under the hood of a vehicle, and subjected to high temperatures and vibrations), CNC foams prepared according to the present disclosure are superior to foams without CNC in such applications.

It is further contemplated that, while the working examples above included CNC, other cellulose reinforcements may also work suitably. And it is further still contemplated that, while the working examples above included only petrol-based polyols, bio-based polyols, such as soy-based polyols, may be substituted at less than or equal to about 50 parts by weight percent, as described in greater detail below.

Petrol and Bio-Based Polyurethane Foams

Various working examples of Petrol and Bio-Based Polyurethane Foams are listed below in Table 3:

TABLE 3

Example/Test Compositions of Petrol and Bio-Based Polyurethane Foams

| Component Type | | 0% Soy | 50% Soy |
|---|---|---|---|
| Polyol Mixture | Parts by weight of total polyol and isocyanate | | |
| Voranol 4701 | Petroleum Polyol | 100.0 | 50.0 |
| Agrol Prime 56 AO | Soy-based polyol | 0.0 | 50.0 |

TABLE 3-continued

Example/Test Compositions of Petrol and Bio-Based Polyurethane Foams

| | Component Type | 0% Soy | 50% Soy |
|---|---|---|---|
| Lumulse POE (26) GLYC | Cell Opener | 1.0 | 1.0 |
| Tegostab B4690 | Surfactant | 0.5 | 0.5 |
| Diethanolamine | Cross Linker | 1.5 | 1.5 |
| Niax a300 | Catalyst | 0.6 | 0.6 |
| Niax A1 | Catalyst | 0.3 | 0.3 |
| Water | Blowing Agent | 3.0 | 3.0 |
| Isocyanate Mixture | | | |
| Rubinate 7304 | Isocyanate (MDI) | 53.8 | 56.4 |

The working examples were produced according to the following procedure. First, a polyol mixture was formed by mixing together about 100 parts by weight percent petrol-polyol (e.g., VORANOL° 4701, available from Dow Chemical Co.), about 1 parts by weight percent cell opener (e.g., LUMULSE® POE (26) GLYC available from Lambent Corporation), about 0.5 parts by weight percent surfactant (e.g., TEGOSTAB® B4690, available from Evonik Nutrition & Care GmbH), a cross-linking agent (e.g., DEA), about 0.6 parts by weight percent of a first catalyst (e.g., NIAX® A1, available from Momentive Performance Materials) and about 0.3 parts by weight of a second catalyst (e.g., NIAX® A300, also available from Momentive Performance Materials), about 3 parts by weight percent blowing agent (e.g., deionized water), and, optionally, cellulose reinforcements, wherein in one variation no cellulose reinforcements were added, in another variation, 0.1 parts by weight percent cellulose reinforcements were added, in a further variation, 0.2 parts by weight percent cellulose reinforcements were added, in a still further variation, 0.4 parts by weight percent cellulose reinforcements were added, and in a yet further variation, 0.8 parts by weight percent cellulose reinforcements were added with a handheld mixer at 1500 rpm for a five minutes. Samples were also prepared wherein, rather than having about 100 parts by weight percent petrol-polyol, the samples instead had about 50 parts by weight petrol-polyol and about 50 parts by weight percent of a soy-based polyol (e.g., AGROL® Prime, available from BioBased Chemicals, LLC), An isocyanate (e.g., RUBINATE® 7304, available from Huntsman International LLC) was added to the polyol mixture and mixed with the hand mixer for 12 seconds. The reaction mixture was poured into a closed mold system that had been coated with Chem-Trend PU-11331 release agent and warmed in a pre-heated oven at 65° C. for 15 minutes. Each foam was able to rise within the mold and demolding time was 6 minutes. Each foam was placed in a pre-heated oven at 65° C. for 15 minutes and subsequently removed from the oven and then at room temperature for a minimum of 12 hours to allow for proper curing.

The resultant foams of the working examples shown in Table 3 had their apparent density tested according to ASTM 3574-08, Test A; their compression force deflection tested according to ASTM 3574-08, Test C; their wet compression tested according to ASTM 3574-08, Test L; their tensile strength at break tested according to ASTM 3574-08, Test E; their elongation at max load tested according to ASTM 3574-08, Test E; and their test strength tested according to ASTM D 624, Die C. SAG factor values of the foams were also calculated from compression stress values. Six samples were measured for each test. Table 4 below shows the results of the respective tests. (Parentheticals represent standard deviation).

TABLE 4

Mechanical Properties of Compositions Formed According to Table 2

| | Density (kg/m³) | Wet Compression Set (% Compression) | Compression Modulus (MPa) | Compression Stress at 25% Strain (MPa) | Compression Stress at 50% Strain (MPa) | Compression Stress at 65% Strain (MPa) |
|---|---|---|---|---|---|---|
| 0% Untreated Cellulose 100% Petrol | 44.6 (1.1) | 13.6 (2.5) | 0.032 (0.005) | 0.0031 (0.0001) | 0.0048 (0.0002) | 0.0077 (0.0004) |
| 0.2% Untreated Cellulose 100% Petrol | 44.6 (2.3) | 10.4 (2.8) | 0.032 (0.003) | 0.0024 (0.0001) | 0.0039 (0.0001) | 0.0068 (0.0003) |
| 0.4% Untreated Cellulose 100% Petrol | 44.0 (2.1) | 12.1 (1.8) | 0.038 (0.003) | 0.0026 (0.0003) | 0.0043 (0.0004) | 0.0076 (0.0005) |
| 0% Treated Cellulose 100% Petrol | 44.2 (1.0) | 14.3 (3.5) | 0.036 (0.004) | 0.0033 (0.0003) | 0.0051 (0.0004) | 0.0081 (0.0005) |
| 0.2% Treated Cellulose 100% Petrol | 44.0 (3.0) | 18.5 (1.3) | 0.025 (0.003) | 0.0021 (0.0004) | 0.0033 (0.0005) | 0.0054 (0.0008) |
| 0.4% Treated Cellulose 100% Petrol | 45.1 (1.2) | 15.2 (3.0) | 0.032 (0.004) | 0.0021 (0.0002) | 0.0036 (0.0003) | 0.0066 (0.0005) |
| 0% Untreated Cellulose 50% Soy | 42.4 (0.9) | 37.5 (1.2) | 0.101 (0.008) | 0.0071 (0.0006) | 0.0110 (0.0006) | 0.0194 (0.0007) |
| 0.1% Untreated Cellulose 50% Soy | 45.8 (1.7) | 35.3 (1.4) | 0.112 (0.019) | 0.0066 (0.0004) | 0.0109 (0.0006) | 0.0200 (0.0019) |
| 0.2% Untreated Cellulose 50% Soy | 44.5 (1.6) | 40.1 (1.0) | 0.111 (0.015) | 0.0076 (0.0006) | 0.0119 (0.0010) | 0.0210 (0.0019) |
| 0.4% Untreated Cellulose 50% Soy | 41.5 (1.6) | 40.0 (1.5) | 0.099 (0.018) | 0.0066 (0.0007) | 0.0103 (0.0009) | 0.0183 (0.0019) |
| 0.8% Untreated Cellulose 50% Soy | 46.6 (1.3) | 44.9 (0.8) | 0.157 (0.043) | 0.0088 (0.0006) | 0.0146 (0.0012) | 0.0276 (0.0040) |
| 0% Treated Cellulose 50% Soy | 43.3 (2.5) | 38.3 (1.5) | 0.074 (0.008) | 0.0064 (0.0003) | 0.0096 (0.0003) | 0.0160 (0.0007) |
| 0.1% Treated Cellulose 50% Soy | 44.2 (1.0) | 43.2 (1.7) | 0.083 (0.008) | 0.0070 (0.0005) | 0.0106 (0.0007) | 0.0178 (0.0010) |
| 0.2% Treated Cellulose 50% Soy | 46.6 (3.1) | 39.3 (1.6) | 0.99 (0.008) | 0.0059 (0.0003) | 0.0101 (0.0005) | 0.0186 (0.0011) |

TABLE 4-continued

Mechanical Properties of Compositions Formed According to Table 2

| | | | | | | |
|---|---|---|---|---|---|---|
| 0.4% Treated Cellulose 50% Soy | 45.1 (0.9) | 41.3 (0.9) | 0.10 (0.006) | 0.0094 (0.0007) | 0.0139 (0.0008) | 0.0228 (0.0012) |
| 0.8% Treated Cellulose 50% Soy | 44.6 (0.9) | 41.3 (1.7) | 0.097 (0.010) | 0.0087 (0.0005) | 0.0129 (0.0006) | 0.0211 (0.0010) |

| | SAG Factor 65%/25% | SAG Factor 50%/25% | Maximum Tensile Strength (kPa) | Elongation at maximum load (mm) | Young's Modulus (kPa) | Tear Resistance (N/m) |
|---|---|---|---|---|---|---|
| 0% Untreated Cellulose 100% Petroleum | 2.5 (0.1) | 1.54 (0.04) | 67.9 (6.9) | 80.6 (7.1) | 110.7 (8.3) | 334.2 (23.5) |
| 0.2% Untreated Cellulose 100% Petroleum | 2.8 (0.2) | 1.61 (0.07) | 57.7 (4.5) | 82.7 (3.7) | 91.4 (10.0) | 289.2 (21.8) |
| 0.4% Untreated Cellulose 100% Petroleum | 2.9 (0.3) | 1.65 (0.10) | 62.0 (3.6) | 87.5 (5.9) | 84.9 (4.3) | 310.6 (28.6) |
| 0% Treated Cellulose 100% Petroleum | 2.5 (0.1) | 1.55 (0.04) | 81.4 (4.5) | 88.5 (6.3) | 131.4 (7.0) | 361.8 (29.1) |
| 0.2% Treated Cellulose 100% Petroleum | 2.6 (0.1) | 1.57 (0.03) | 48.5 (7.5) | 71.3 (4.7) | 87.0 (14.5) | 290.5 (29.7) |
| 0.4% Treated Cellulose 100% Petroleum | 3.1 (0.3) | 1.73 (0.09) | 52.0 (7.4) | 78.5 (11.7) | 81.3 (9.6) | 272.7 (23.7) |
| 0% Untreated Cellulose 50% Soy | 2.7 (0.2) | 1.55 (0.05) | 62.6 (4.1) | 64.3 (5.1) | 188.4 (24.8) | 390.8 (26.6) |
| 0.1% Untreated Cellulose 50% Soy | 3.1 (0.3) | 1.65 (0.09) | 62.2 (2.9) | 60.9 (3.4) | 201.1 (19.8) | 300.1 (28.4) |
| 0.2% Untreated Cellulose 50% Soy | 2.8 (0.2) | 1.57 (0.05) | 65.2 (4.7) | 64.3 (5.2) | 211.2 (31.7) | 395.3 (24.4) |
| 0.4% Untreated Cellulose 50% Soy | 2.8 (0.4) | 1.57 (0.11) | 58.7 (5.6) | 66.6 (5.2) | 161.1 (7.3) | 373.6 (18.8) |
| 0.8% Untreated Cellulose 50% Soy | 3.2 (0.6) | 1.66 (0.13) | 83.6 (9.0) | 72.0 (6.5) | 246.6 (13.1) | 364.9 (19.4) |
| 0% Treated Cellulose 50% Soy | 2.5 (0.2) | 1.51 (0.06) | 63.4 (5.2) | 59.5 (4.2) | 237.0 (11.6) | 417.6 (21.8) |
| 0.1% Treated Cellulose 50% Soy | 2.5 (0.2) | 1.52 (0.04) | 74.4 (5.4) | 69.9 (6.4) | 223.1 (16.3) | 376.2 (16.4) |
| 0.2% Treated Cellulose 50% Soy | 3.1 (0.1) | 1.71 (0.03) | 60.2 (7.1) | 61.5 (5.3) | 214.4 (20.3) | 354.4 (30.6) |
| 0.4% Treated Cellulose 50% Soy | 2.4 (0.1) | 1.48 (0.04) | 95.5 (4.6) | 79.2 (6.4) | 239.7 (21.0) | 493.8 (21.5) |
| 0.8% Treated Cellulose 50% Soy | 2.4 (0.1) | 1.47 (0.04) | 90.0 (4.0) | 73.1 (3.8) | 263.8 (15.7) | 477.8 (27.8) |

The results and data presented in Tables 3 and 4 demonstrate that polyurethane foam produced from petrol-based polyol compositions including treated or untreated cellulose reinforcements compared to petrol-based polyol compositions without treated or untreated cellulose reinforcements exhibit superior mechanical properties. Moreover, the results and data presented in Tables 3 and 4 demonstrate that polyurethane foam produced from soy-based polyol and petrol-based polyol compositions have mechanical properties similar to polyurethane foams produced from petrol-based polyol compositions. Even with as much as 50 parts by weight percent soy-based polyols and a balance of petrol-based polyol, the addition of treated or untreated cellulose reinforcements have mechanical properties that approximate (or even exceed) polyurethane foams using only petrol-based polyols. Without wishing to be bound by theory, it is believed that polyol mixtures including substantial amounts of other bio-based polyols may form foams with similar mechanical properties to polyurethane forms using soy-based polyols or only petrol-based polyols.

The polyurethane foams disclosed hereunder may be used in various applications where it is desirable to have foams having the properties disclosed hereunder. Further, the polyurethane foams disclosed hereunder may be used in various automotive applications and for vehicle components, including but not limited to seat backs, seat cushions, headrests, armrests, headliners, sound absorption and vibration dampening equipment, engine covers, instrument panels, and bumpers.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

Although the terms first, second, third, etc. may be used to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example forms. Furthermore, an element, component, region, layer or section may be termed a "second" element, component, region, layer or section, without the need for an element, component, region, layer or section termed a "first" element, component, region, layer or section.

Spacially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

As used herein, the phrase at least one of A, B, and C should be construed to mean a logical (A OR B OR C), using a non-exclusive logical OR, and should not be construed to mean "at least one of A, at least one of B, and at least one of C."

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A polyurethane foam produced by reacting a polyol-containing composition and an isocyanate composition, wherein the polyol-containing composition comprises:
   a petrol-based polyol at greater than or equal to about 50 parts by weight percent of the polyol-containing composition; and
   cellulose reinforcements, wherein the cellulose reinforcements have an aspect ratio of at least about 200.

2. The polyurethane foam of claim 1, wherein the polyurethane foam further comprises at least one of a cell opener, a surfactant, a cross-linking agent, a catalyst, and a water blowing agent.

3. The polyurethane foam of claim 1 further comprising:
   a cell opener is at about 1.8 parts by weight percent;
   a surfactant at about 0.9 parts by weight percent;
   a cross-linking agent at about 2.7 parts by weight percent;
   a catalyst comprising a first catalyst at about 1.1 parts by weight percent and a second catalyst at about 0.5 parts by weight percent;
   and a water blowing agent at about 5.5 parts by weight percent.

4. The polyurethane foam of claim 1, wherein the polyurethane foam further comprises less than or equal to about 50 parts by weight percent of a soy-based polyol of the polyol-containing composition.

5. The polyurethane foam of claim 1, wherein the polyurethane foam further comprises carbon nanocrystals at greater than or equal to about 0.1 parts by weight percent to less than or equal to about 0.5 parts by weight percent.

6. A vehicle component comprising the polyurethane foam of claim 1.

7. The polyurethane foam of claim 1, wherein the isocyanate composition is at about 33.48 parts by weight percent of the polyol-containing composition and the isocyanate composition.

8. A polyurethane foam produced by reacting a polyol-containing composition and an isocyanate composition, wherein the polyol-containing composition comprises:
   a soy-based polyol at less than or equal to about 50 parts by weight percent of the polyol-containing composition;
   cellulose reinforcements at less than or equal to about 0.8 parts by weight percent; and
   a balance of a petrol-based polyol,
   wherein the cellulose reinforcements have an aspect ratio of at least about 200.

9. The polyurethane foam of claim 8, wherein the polyurethane foam further comprises at least one of a cell opener, a surfactant, a cross-linking agent, a catalyst, and a water blowing agent.

10. The polyurethane foam of claim 8, further comprising:
    a cell opener at about 1 parts by weight percent;
    a surfactant at about 0.5 parts by weight percent;
    a cross-linking agent is at about 1.5 parts by weight percent;
    a catalyst comprising a first catalyst at about 0.6 parts by weight percent and a second catalyst at about 0.3 parts by weight percent; and
    a water blowing agent at about 3 parts by weight percent.

11. The polyurethane foam of claim 8, wherein the isocyanate composition is at greater than or equal to about 33.48 parts by weight percent to less than or equal to about 34.54 parts by weight percent of the polyol-containing composition and the isocyanate composition.

12. A vehicle component comprising the polyurethane foam of claim 8.

13. A polyurethane foam produced by reacting a polyol-containing composition and an isocyanate composition, wherein the polyol-containing composition comprises:
   cellulose reinforcements at less than or equal to about 0.8 parts by weight percent; and
   a balance of a petrol-based polyol,
   wherein the cellulose reinforcements have an aspect ratio of at least about 200.

14. The polyurethane foam of claim 13, wherein the polyurethane foam further comprises at least one of a cell opener, a surfactant, a cross-linking agent, a catalyst, and a water blowing agent.

15. The polyurethane foam of claim 13, further comprising:
   a cell opener at about 1 parts by weight percent;
   a surfactant at about 0.5 parts by weight percent;
   a cross-linking agent at about 1.5 parts by weight percent;
   a catalyst comprising a first catalyst at about 0.6 parts by weight percent and a second catalyst at about 0.3 parts by weight percent; and
   a water blowing agent at about 3 parts by weight percent.

16. A vehicle component comprising the polyurethane foam of claim 13.

17. A vehicle component comprising the polyurethane foam of claim 13, wherein the vehicle component comprises at least one of an engine cover, a headliner, an instrument panel, a vehicle seat, and an armrest.

18. The polyurethane foam of claim 13, further comprising less than or equal to about 50 parts by weight percent of a soy-based polyol of the polyol-containing composition.

19. The polyurethane foam of claim 13, wherein the isocyanate composition is at greater than or equal to about 33.48 parts by weight percent to less than or equal to about 34.54 parts by weight percent of the polyol-containing composition and the isocyanate composition.

20. The polyurethane foam of claim 13, wherein the cellulose reinforcements comprise at least one of a microcellulose filament, a nanocellulose filament, a cellulose filament, a cellulose nanofiber, and a cellulose nanocrystal.

* * * * *